A. HUNT.
Snatch-Block.

No. 168,498. Patented Oct. 5, 1875.

Witnesses,
J. H. Skidmore
W. E. Chaffee

A. Hunt
By his atty
Howson & Son

UNITED STATES PATENT OFFICE.

AUGUSTUS HUNT, OF PHILADELPHIA, PENNSYLVANIA.

IMPROVEMENT IN SNATCH-BLOCKS.

Specification forming part of Letters Patent No. 168,498, dated October 5, 1875; application filed August 24, 1875.

*To all whom it may concern:*

Be it known that I, AUGUSTUS HUNT, of Philadelphia, Pennsylvania, have invented an Improved Snatch-Block, of which the following is a specification:

My invention relates to an improvement in that class of snatch-blocks in which the pulley-block is so linked to a pin or bolt, that it will accommodate itself to the different positions assumed by the rope, an example of such a block being shown in the patent of George Focht, September 28, 1858, reissued January 17, 1865; and the object of my improvement is to so construct the snatch-block that, while it can thus accommodate itself to the rope, the joint which permits this self-adjustment shall be effectually protected from deteriorating exposure.

This object I attain in the manner which I will now proceed to describe, reference being had to the accompanying drawing, in which—

Figure 1:
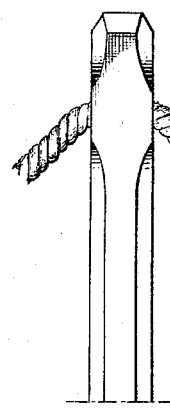
Figure 1:
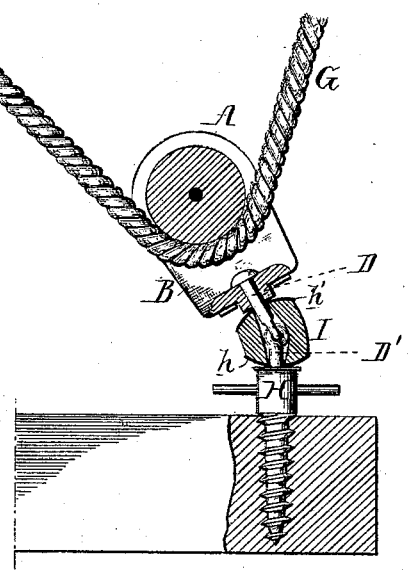
Figure 2:

Figure 1 is a side view, partly in section, of my improved snatch-block, and Fig 2 an edge view.

A is the sheave or pulley, which is situated, as usual, between and hung by a pin to the cheeks of a frame, B, the whole forming a pulley-block, which does not differ materially from those of ordinary construction. Through the lower end of the frame B passes a pin, D, having at the upper end a head and at the lower end an eye coupled to a like eye on the upper end of a pin, D', which, in the present instance, is attached to a stem, H, provided with a pointed screw for ready attachment to the timbers of a wharf or other object. As the block B can turn freely on the pin D, the pin D', also admitting of being turned, and as the two pins are loosely linked together, the pulley-block is connected to the stem by a universal joint, which permits the said block to assume any position which that of the rope G may demand.

On the top of the stem H is a circular plate or disk, $h$, there being a like disk below the block B, and between these disks is confined a tubular block, I, of rubber, under pressure, so that rain or snow cannot penetrate between it and the disks; hence, the linked portions of the pins D and D', which are contained within the rubber block, are thereby effectually protected from exposure, which, in the absence of this protecting medium, would tend to rapidly wear away and deteriorate the joint.

If desired, a lubricating substance may be placed within the block to still further prevent the undue wearing of the joint.

The tendency of the rubber is to maintain the pulley-block in a vertical position, but will easily yield and accommodate itself to the different angles which the block may have to assume, and still continue its protecting duty.

The stem H and its screw are not indispensable, for the pin D' may be attached to any permanent object by different appliances.

I claim as my invention—

The combination, substantially as described, of the pulley-block and the coupled pins D and D', with the tubular block I of rubber, and the disks $h$ and $h'$, between which the said rubber is confined under pressure.

In testimony whereof I have signed my name to this specification in the presence of two subscribing witnesses.

AUGUSTUS HUNT.

Witnesses:
 HUBERT HOWSON,
 HARRY SMITH.